United States Patent [19]
Lawther et al.

[11] Patent Number: 5,483,314
[45] Date of Patent: Jan. 9, 1996

[54] FILM CARTRIDGE LOADING APPARATUS FOR CAMERA

[75] Inventors: Joel S. Lawther, Rochester; Donald P. McGinn, Palmyra, both of N.Y.

[73] Assignee: Eastman Kodak Company, Rochester, N.Y.

[21] Appl. No.: 205,001

[22] Filed: Mar. 1, 1994

[51] Int. Cl.$^6$ .......................... G03B 19/10; G03B 17/26; G03B 17/02
[52] U.S. Cl. .......................... 354/174; 354/275; 354/288
[58] Field of Search .................................... 354/275, 288, 354/174

[56] References Cited

U.S. PATENT DOCUMENTS

| | | | |
|---|---|---|---|
| 3,543,664 | 12/1970 | Kremp et al. | 95/31 |
| 3,672,279 | 6/1972 | Hackenberg et al. | 93/31 R |
| 4,095,249 | 6/1978 | Miura | 354/288 |
| 4,330,190 | 5/1982 | Chan | 354/275 |
| 5,049,914 | 9/1991 | Dassero | 354/288 |
| 5,142,316 | 8/1992 | Tanii et al. | 354/212 |
| 5,155,514 | 10/1992 | Tamamura | 354/174 |
| 5,159,365 | 10/1992 | Takahashi et al. | 354/21 |

FOREIGN PATENT DOCUMENTS 3113578  10/1982  Germany .
2154245  6/1990  Japan .
41625    1/1992  Japan .

Primary Examiner—Michael L. Gellner
Assistant Examiner—Nicholas T. Tuccillo
Attorney, Agent, or Firm—David A. Howley

[57] ABSTRACT

A camera is provided with a loading chamber insertion mechanism for receiving a film cartridge of the type having a retention slot formed therein inserted manually into an insertion position by positively engaging the retention slot, pulling the cartridge into the chamber, and seating the cartridge in a seated position. A movable clamp and escapement mechanism are operable in an initial, insertion position for latching a carriage against movement in response to a biasing force provided by a tensioning spring. The movable clamp is pivotally mounted to the clamp for movement within escapement channels that cooperatively latch the carriage in the insertion position. The clamp pivots on the carriage within the escapement channels on being contacted by the film cartridge during its initial end-wise insertion by the user. The clamp pivots in the escapement channels to an intermediate, unlatched position that releases the carriage for movement in response to the biasing force and simultaneously engages the film cartridge retention slot. The carriage and clamp are pulled by the spring biasing force through the escapement channels and in turn pull on the engaged film cartridge to effect seating of the film cartridge in the loading chamber.

18 Claims, 5 Drawing Sheets

FILM CARTRIDGE LOADING APPARATUS FOR CAMERA

CROSS-REFERENCE TO RELATED APPLICATIONS

Reference is made to commonly assigned, co-pending patent application Ser. No. 08/075,969, filed Jun. 11, 1993, by Lawther et al., and entitled APPARATUS FOR CONTROLLING THE MOVEMENT OF A FILM CARTRIDGE FROM A LOADING CHAMBER IN A CAMERA and to commonly assigned, co-pending patent application Ser. No. 08/072,619, filed Jun. 4, 1993, by Richiuso et al., and entitled CASSETTE EJECTING APPARATUS, and to commonly assigned, co-pending patent application Ser. No. 08/204,723 filed on even date herewith by Lawther et al., entitled FILM CARTRIDGE LOADING AND ELECTING APPARATUS FOR CAMERA.

1. Field of the Invention

The present invention relates generally to the field of photography, and more particularly, to an improved film cartridge handling mechanism for effecting end-wise loading and ejection of a film cartridge into and from a loading chamber of a camera.

2. Background of the Invention in conventional cameras, 35 mm film cartridges or cassettes are loaded from the side through a hinged camera back into a loading chamber on one side of the image frame exposure gate, and the filmstrip is either manually or automatically directed through the exposure gate and wound on a take-up reel. After all image frames are exposed, the filmstrip is either automatically rewound by a motorized drive or manually rewound into the cartridge. The cartridge is then typically removed by opening the hinged camera back, releasing the drive from the cartridge hub and manually withdrawing the cartridge from the loading chamber.

More recently, it has been proposed to load and eject conventional and modified 35 mm cartridges in an end-wise fashion through a sliding or pivoted door in the bottom or side of the camera body and to employ motorized filmstrip winding and rewinding apparatus to advance the filmstrip out of and back into the cartridge. Such cameras are disclosed, for example, in commonly assigned U.S. Pat. No. 5,049,914 and in U.S. Pat. Nos. 5,155,514, 5,159,365 and 5,142,316. In the '914 patent, a camera loading chamber and mechanism is provided for receiving and ejecting a "thrust" style 35 mm cartridge which does not have a protruding film leader and has an actuable cartridge door through which the filmstrip is ejected and rewound. The cartridge is received in the loading chamber by closing the door and ejected partially from the loading chamber when the door is opened by an ejecting pin linked to the door.

Moreover, an improved loading chamber ejection mechanism for such a thrust cartridge is set forth in the above-referenced co-pending '619 application. The ejection mechanism operates in conjunction with a door supported first for translational movement pan way from the loading chamber and then for pivotal movement further from the chamber such that the film cartridge or cassette is also moved translationally during both door movements.

A further thrust style, film cartridge, having a groove extending longitudinally along its outer surface for engagement by a retention member during movement of the film cartridge from a camera loading chamber, has been proposed in the above-referenced '969 application. An improved mechanism for receiving and ejecting the cartridge from the loading chamber is disclosed, wherein the groove in the cartridge is engageable by the retention member upon partial insertion into the chamber and remains in engagement upon ejection to prevent the film cartridge from falling out. The user may complete the withdrawal of the cartridge by simply pulling the partially ejected cartridge out, overcoming the retention fierce.

Problems to be Solved by the Invention—In the prior art as described above, it is necessary for the user to fully insert the cartridge into the seated position where it is then mechanically locked. No provision is made for effecting a positive insertion of the film cartridge into the film loading chamber after the cartridge is partially inserted by the user.

SUMMARY OF THE INVENTION

It is therefor a principal object of the present invention to provide a seating mechanism that positively engages with the film cartridge to complete its insertion into a loading chamber upon partial manual insertion of the cartridge so that the cartridge is positively seated and the user is alerted to the seating action.

It is still a further object of the present invention to provide a loading chamber and apparatus for end-wise receiving and positively loading a film cartridge initially inserted manually into the opening of the chamber.

In accordance with the invention, a camera is provided with a loading chamber having an end opening for receiving a film cartridge of the type having positive engagement means formed therein and further comprising positive insertion means operable upon partial manual loading of the cartridge through the end opening into engagement with the positive engagement means for positively pulling and seating said film cartridge fully into the loading chamber to assure the user that the film cartridge is loaded properly in the loading chamber.

In accordance with a preferred embodiment of the invention, positive insertion means further comprises carriage means for movement alongside the elongated loading chamber between an insertion position and a latch position; clamp means mounted fir pivotal movement from a first position to a second position with respect to the carriage means; first means extending from the clamp means into the loading chamber for making contact with the drive end of the film cartridge upon partial manual loading of the film cartridge and for pivoting the clamp means to the second position; second means extending from the clamp means into the loading chamber and into engagement with the elongated retention slot on movement of the clamp means into the second position; tensioning means for moving the carriage means to the latch position; escapement means for maintaining the carriage means in the insertion position against the tension of the tensioning means when the clamp means is in the first position and responsive to movement of the clamp means into the second position for releasing the carriage means for movement to the latch position while maintaining the second means in engagement with the elongated retention slot to load and seat the film cartridge in the loading chamber. Preferably, the escapement means further comprises first escapement channel means having a transverse section generally transverse to the axis of the elongated the loading chamber and a parallel section generally parallel to the axis; first roller means mounted to one side of the clamp means for rolling movement between the transverse and parallel sections of the first escapement channel means in movement of the clamp means between the first and second positions; second escapement channel means having a transverse section generally transverse to the axis of the elongated the loading chamber and a parallel section generally parallel to the axis; and second roller means mounted to the opposite side of the clamp means for rolling movement between the transverse and parallel sections of the first escapement channel means in movement of the clamp means between the first and second positions.

Advantageous Effects of the Invention—Advantageously, the present invention allows the film cartridge to be positively seated with no effort by the user beyond initially inserting the film cartridge and tripping the release of the film cartridge engagement means. Then the carriage means takes over and end-wise loads the film cartridge and effects a positive seating, so that the door to the loading chamber may be closed. The door does not contact the film cartridge in order to insert and seat it and is not subject to damage by the user attempting to close the door with the cartridge extending through the opening.

BRIEF DESCRIPTION OF THE DRAWINGS

Other objects, advantages and features of the present invention will become apparent from the following specification when taken in conjunction with the accompanying drawings in which like elements are commonly enumerated and in which.

The drawings are schematic and not directed to any particular camera structure or film format and size.

DETAILED DESCRIPTION OF THE PREFERRED EMBODIMENT

The invention is disclosed as being embodied preferably in a still-picture camera employing a film cartridge, e.g. a 35 mm film cartridge. Because the features of this type of camera are generally well known, the description which follows is directed in particular to camera elements forming pan of or cooperating directly with the preferred embodiment. It is to be understood, however, that other elements not shown or described may take various forms known to one of ordinary skill in the art.

Figure 1:
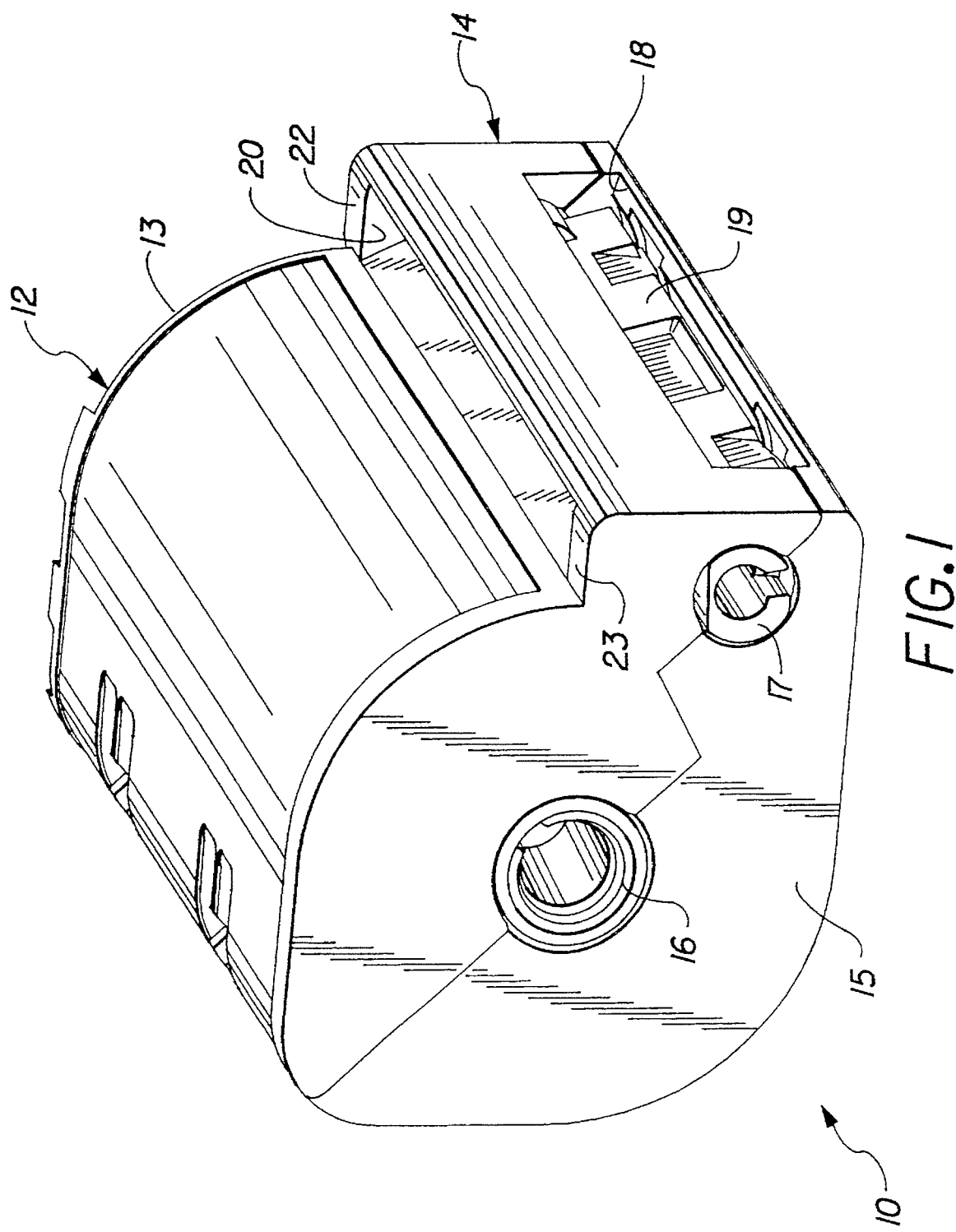
FIG. 1 is a perspective view of a film cartridge having a retention groove.

Referring now to the drawings and first to FIG. 1, it depicts in perspective view a thrust type film cartridge 10 containing a filmstrip wound on a spool (both within the opaque plastic or metal cartridge shell 12) attached to a core or hub 16 in a manner similar to the film cartridge or cassette disclosed in the above-referenced '914 patent. The filmstrip may be thrust out of the cartridge shell 12 by application of rotary motion to the cartridge spool 16 to thrust its leading end through the light trapping opening in cartridge snout 14. A retention slot 20 is formed in the inner surface of cartridge snout 14 extending longitudinally between portions 22 and 23 of respective ends of snout 14 and shell 12. The shell 12 has a first, leading end 13 and a second non-drive end 15.

The door drive interface 17 is intended to be engaged by a door opening driver (not shown) of the camera that extends into the loading chamber of the camera body to effect the opening of a cartridge door 19 over the opening 18 when the filmstrip is to be thrust out of or re-wound back into the cartridge 10.

The cartridge 10 is intended to be inserted end-wise into a loading chamber of a camera body through an open hinged door in the base of the camera body as generally depicted in FIGS. 14 and 15 of the '914 patent. However, the '914 patent does not disclose any retention slot 20 in the cartridge 10, and the loading and ejecting mechanism is constructed and functions differently than the loading apparatus and method of operation of the present invention.

Figure 2:
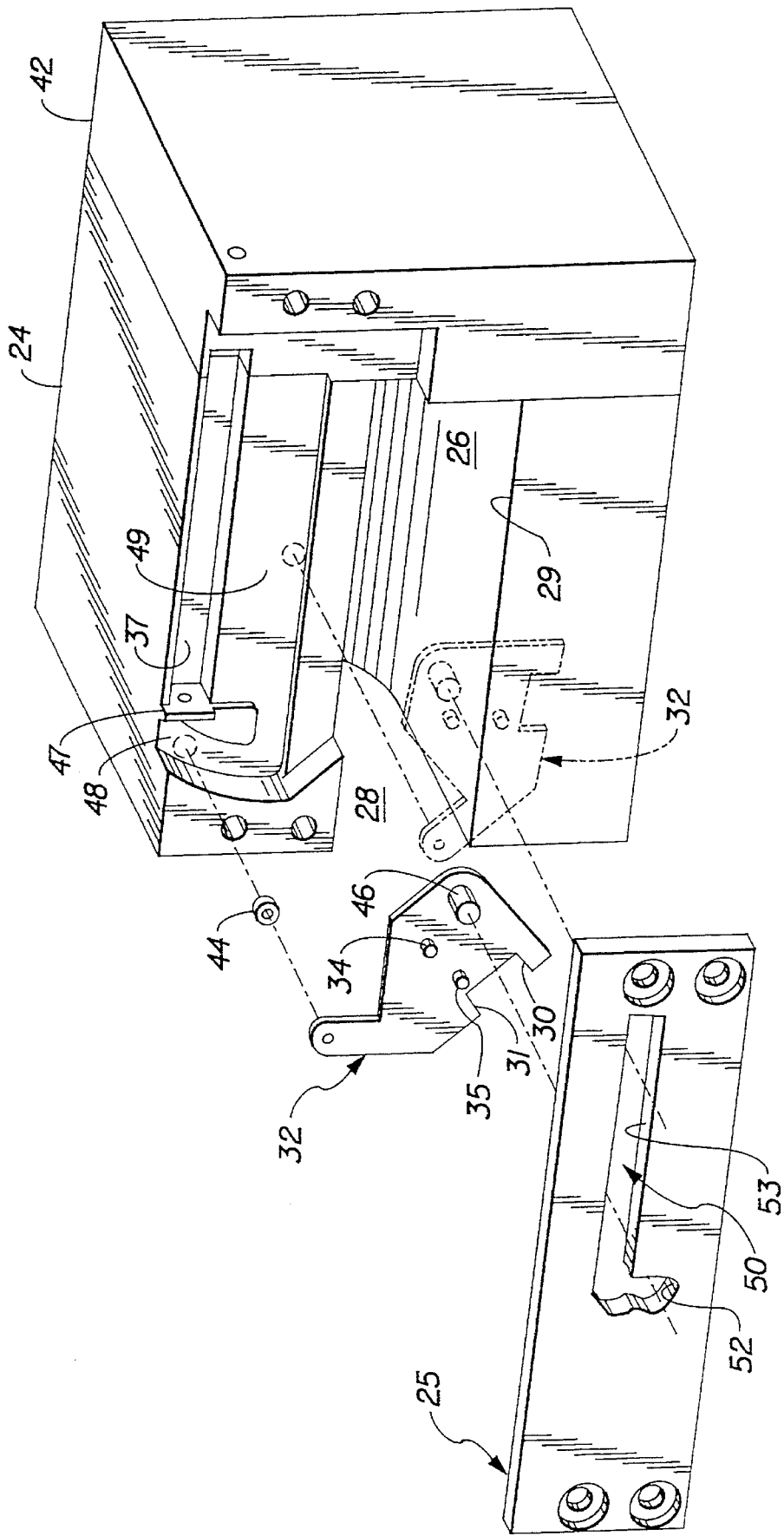
FIG. 2 is a perspective exploded view of certain of the components of the positive film cartridge loading apparatus of the invention in relation to the loading chamber of the camera body.

Turning to FIG. 2, it schematically depicts in an exploded perspective view certain of the components of a camera body portion 24 having a loading chamber 26 configured to receive the cartridge 10 and orient the cartridge snout 14 and opening 18 toward a camera space gate and take-up reel, which are not shown. The loading chamber 26 has an end opening 28 for end-wise receiving the film cartridge 10 of FIG. 1 and a side opening 29 through which the cartridge snout 14 is presented. The loading chamber 26 is therefore shaped to receive the cartridge.

Figure 3:
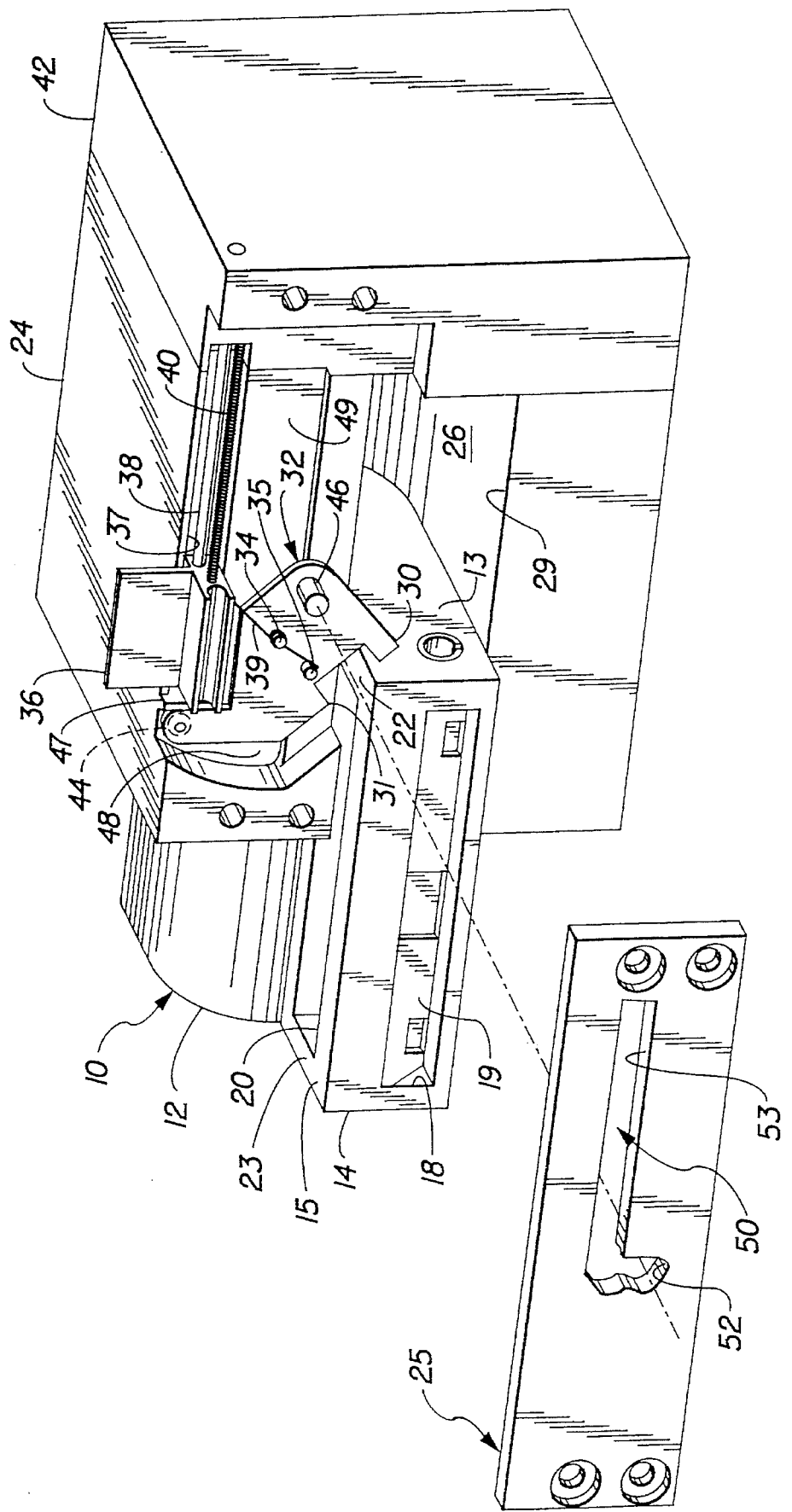
FIGS. 3–5 are perspective exploded views of the components of the positive film cartridge loading apparatus of the invention in the insertion, intermediate and final seated positions of the film cartridge in relation to the loading chamber of the camera body.
Figure 5:
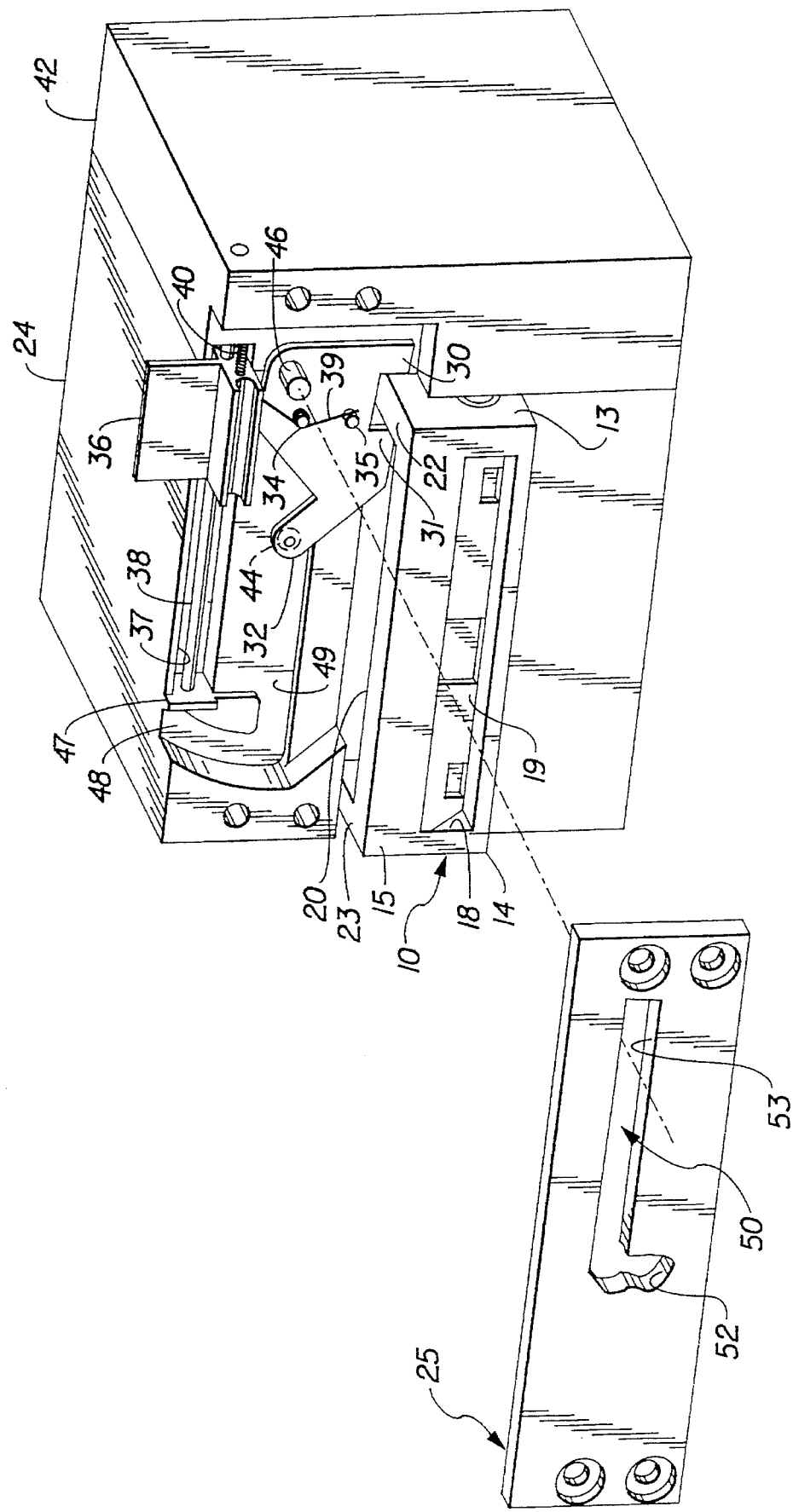

A C-clamp 32 is shown in solid lines in the insertion position of FIG. 3 and in dotted lines in the seated position of FIG. 5 in relation to an upper roller escapement channel 49 formed in camera body portion 24 and a lower roller escapement channel 50 formed in a plate 25. Plate 25 is to be attached to the camera body portion 24 at the respective ends thereof with the C-clamp 32 arranged therebetween. The C-clamp 32 has a lower roller 46 projecting from one surface thereof into the lower roller escapement channel 50 and an upper roller 44 (shown detached) projecting from the opposite surface thereof into the upper roller escapement channel 49. The escapement channels 49 and 50 are formed parallel to one another and are positioned on either side of the C-clamp 32 when the plate 25 is attached to the camera body portion 24. Lower roller escapement channel 50 includes the straight leg section 53 and the laterally extending lower roller shelf 52 in which the lower roller 46 rests in the insertion position for receiving or removing a film cartridge. The upper roller escapement channel 49 is formed in the camera body portion 24 with an arcuate upper roller shelf 48 in which the upper roller 44 rests in the insertion position. The C-clamp 32 pivots and traverses the sections of escapement channels 49 and 50 on the rollers 44 and 46 when a film cartridge is inserted in the manner described hereafter. The C-clamp 32 is adapted to be pivoted about a pair of pivot pins 34 and 35 that project from the surface of the C-clamp 32 and are employed in relation to a carriage that fits in elongated carriage channel 37 in a manner to be described. The C-clamp 32 is formed with a C-shaped opening bounded by the tabs 30 and 31 that make engagement with the film cartridge 10.

Figure 4:
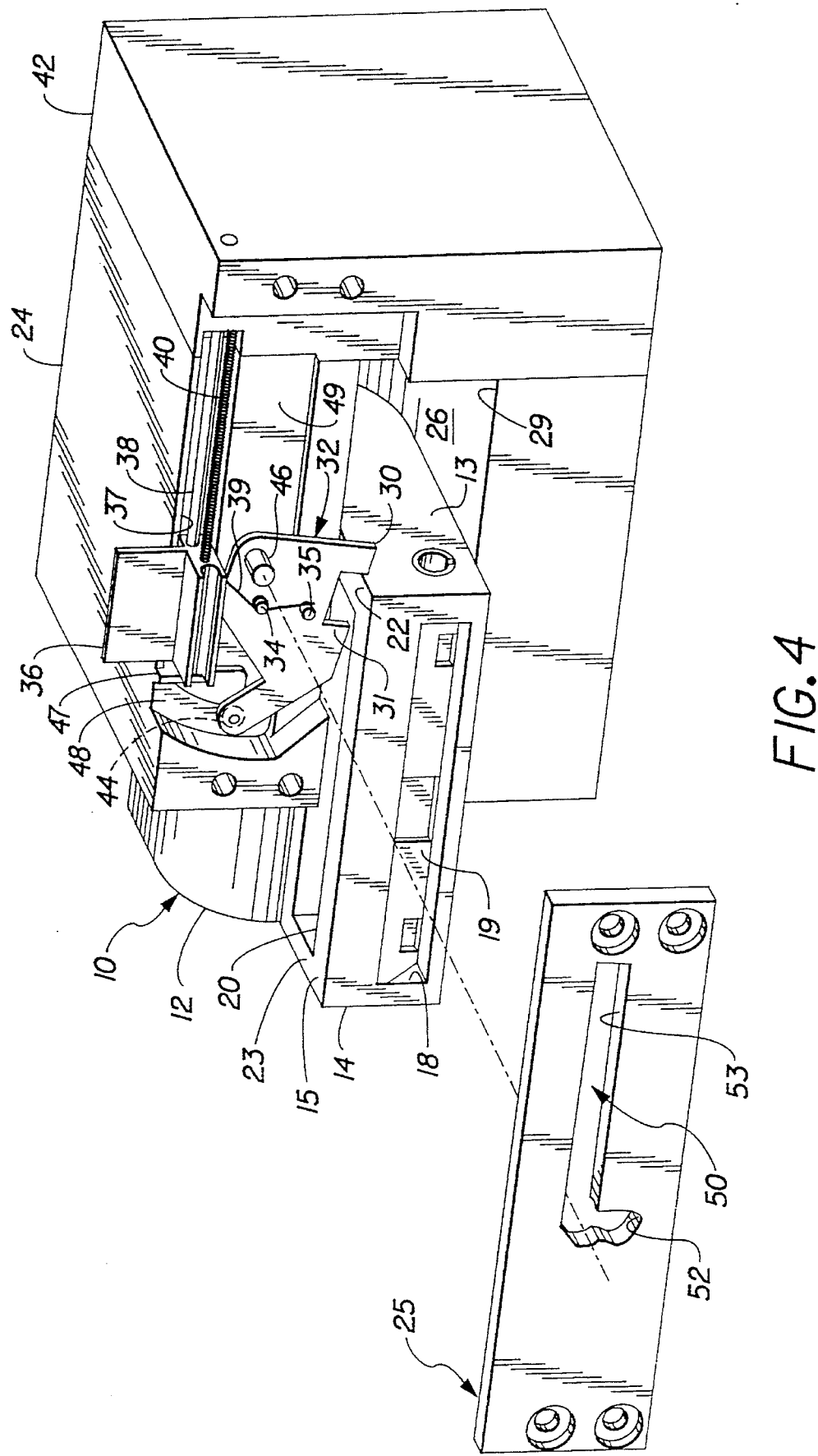

Turning to FIGS. 3–5, the cartridge 10 is depicted in relation to the schematically illustrated camera body 24 and loading chamber 26 in the insertion, intermediate and seated positions. The C-clamp 32 is fitted with the upper and lower rollers 44, 46 in the respective upper and lower roller escapement channels 49, 50 and is attached to carriage 36 through a spring wire 39. Spring wire 39 is wrapped around pivot pin 34 and has one end engaging pivot pin 35 and the other engaging carriage 36. Spring wire 39 biases the C-clamp 32 to pivot clockwise toward the insertion position of FIG. 3.

Carriage 36 is block shaped and formed with one or more parallel bores or grooves that receive and ride on one or more respective rod(s) 38 that extend in the carriage channel 37 in the camera body portion 24. An extension coil spring is attached to one end of carriage 36 and to the loading chamber base 42 and extends along the channel 37. Carriage 36 is therefor biased by the stretching of the extension coil spring 40 to move toward the base 42 of the chamber 26, but is prevented from doing so as long as the C-clamp 32 is locked in the insertion position shown in FIGS. 2 and 3. Thus, when the carriage 36 is freed from engagement in the latched position of FIGS. 2 and 3, spring 40 pulls it along the carriage track formed by the rod(s) 38 into the seated position of the FIG. 4.

As shown in FIG. 3, the loading mechanism is depicted in the insertion position for receiving the film cartridge 10, which is also the position that the insertion mechanism is left in from which the previous film cartridge was ejected. The roller 44 is engaged or hooked in the low spot of the arcuately shaped upper roller shelf 48 of upper roller escapement channel 49. At the same time, the lower roller 46 is lodged on the lower roller shell 52 in the lower roller escapement channel 50. The cartridge 10 is shown entering the opening 28 of the chamber 26 which is effected after the loading chamber door (not shown) is opened and the cartridge 10 is manually oriented and moved end-wise through the opening 28. The leading drive end 13 of cartridge 10 bears against a tab 30, and further manual insertion of the film cartridge 10 starts to pivot the C-shaped clamp 32 about pivot point 34.

Thus, during manual loading, the leading drive end 13 of the film cartridge 10 makes contact with the tab 30, pivoting C-clamp 32 from the insertion position of FIG. 3 to the intermediate position of FIG. 4. The C-clamp 32 is pivoted counter-clockwise on pivot point 34 causing the upper roller 44 to ride up on the arcuate upper roller shelf 48 and into alignment with the straight portion of the upper roller escapement channel 49. The pivotal movement causes the lower roller 46 to roll down the lower roller shelf 52 and into alignment with lower roller leg section 53 of the lower roller escapement channel 50. At the same time, the tab 31 pivots into the retention slot 20 of cartridge 10 to make engagement with the portion 22 of lip 14. FIG. 4 depicts this movement of upper and lower rollers 44 and 46 to the very edges of the transitions to the parallel extending sections of the upper and lower roller escapement channels 49 and 50, respectively. At this depicted position, the tab 31 is poised to engage the retention slot 20.

Further insertion movement of cartridge 10 pivots the rollers 44 and 46 into the parallel extending sections of the upper and lower roller escapement channels 49 and 50, respectively. When this occurs, the C-clamp 32 is unlatched so that the upper and lower rollers 44 and 46 can travel in the leg sections of the upper and lower roller escapement channels. The carriage 36 is released, and the spring 40 pulls it down the carriage channel 37 toward the base 42, pulling C-clamp 32 along. The tab 30 is in engagement with portion 22 of cartridge snout 14 and pulls the cartridge 10 along with it. Cartridge 10 is thereby positively seated in loading chamber 26 by the spring force of tensioning spring 40 as shown in FIG. 5.

No specific ejection mechanism for ejecting cartridge 10 is depicted in the FIGS. 2-5, although manual ejection may be accomplished if carriage 36 projects outside the camera body. Then ejection may be accomplished by manually sliding the carriage 36 in the carriage channel 37 back up to the insertion position. It is contemplated that the ejection mechanism of the above-referenced 08/204,723 application or the '619 application, both incorporated herein by reference, may also be incorporated into the present invention. With respect to the ejection mechanism of the 08/204,723 application, the ejection mechanism may comprise a door operated ejector that is engaged with carriage 36 to lift it against the force of tensioning spring 40 and lift C-clamp 32 back into the insertion position of FIG. 2, thereby lifting and ejecting the film cartridge 10.

In any case, the cartridge 10, the carriage 36 and the C-clamp 32 move as a unit back toward the intermediate position of FIG. 4. The cartridge 10 is retained in that position by the tabs 30 and 31 so that it may not fall out of the loading chamber 26. Manual or automatic removal of the cartridge 10 from the opening 28 pivots tab 31 clockwise, and the rollers 44 and 46 move into the respective shelves 48 and 52 where they are retained by the arcuate shapes and the biasing of wire spring 39.

The C-clamp 32 remains in the insertion position of FIG. 3 ready for accepting a new film cartridge 10. If none is to be inserted at the time, the door may be closed and re-opened later without changing the insertion position of the C-clamp 32.

In this fashion, the present invention allows the film cartridge to be positively seated with no effort by the user beyond initially inserting the film cartridge and releasing the C-clamp to effect a positive seating, so that the door to the loading chamber may be closed. The ejection may be manually instigated or mechanically effected on opening of the door to effect partial ejection of the film cartridge by the ejection mechanism. Unless automatically over-ridden as part of the ejection mechanism, the filmstrip is retained partially ejected until it is manually removed to avoid dropping the cartridge.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–5

10 film cartridge
12 cartridge shell
13 leading drive end
14 cartridge snout
15 non-drive end
16 cartridge spool
17 door drive interface
18 door opening
19 cartridge door
20 retention slot
22 portion of cartridge snout 14 at end 13
23 portion of cartridge snout 14 at end 15
24 portion of camera body
26 loading chamber
28 loading chamber opening
29 side opening
30 upper tab
31 lower tab
32 C-clamp
34 pivot pin
35 pivot pin
36 carriage 37 carriage channel
38 carriage rod
39 wire spring
40 tensioning spring
42 base of loading chamber
44 upper roller
46 lower roller
47 boss
48 arcuate upper roller shelf
upper roller escapement channel
lower roller escapement channel
lower roller shelf
lower roller leg section

What is claimed is:

1. A camera having a loading chamber for receiving a film cartridge of the type having positive engagement means formed therein comprising:

a loading chamber for receiving said film cartridge loaded manually through an end opening thereof; and positive insertion means operable upon partial manual loading of the cartridge through said end opening into engagement with said positive engagement means for positively pulling and seating said film cartridge fully into said loading chamber to assure the user that said film cartridge is loaded properly in said loading chamber, said film cartridge further including an elongated cartridge shell for retaining a photographic filmstrip and said positive engagement means further including an elongated retention slot formed in said cartridge shell along the length thereof.

2. The camera of claim 1 wherein said positive insertion means seats said film cartridge fully into said loading chamber with an audible sound.

3. The camera of claim 1 wherein said positive insertion means further comprises:

carriage means for movement alongside said elongated loading chamber between an insertion position and a latch position;

clamp means mounted for pivotal movement from a first position to a second position with respect to said carriage means;

first means extending from said clamp means into said loading chamber for making contact with said drive end of said film cartridge upon partial manual loading of said film cartridge and for pivoting said clamp means to said second position;

second means extending from said clamp means into said loading chamber and into engagement with said positive engagement means on movement of said clamp means into said second position;

tensioning means for moving said carriage means to said latch position;

escapement means for maintaining said carriage means in said insertion position against the tension of said tensioning means when said clamp means is in said first position and responsive to movement of said clamp means into said second position for releasing said carriage means for movement to said latch position while maintaining said second means in engagement with said positive engagement means to load and seat said film cartridge in said loading chamber.

4. The camera of claim 3 wherein said positive insertion means seats said film cartridge fully into said loading chamber with an audible sound.

5. The camera of claim 3 wherein said escapement means further comprises:

first escapement channel means having a transverse section generally transverse to the axis of said elongated said loading chamber and a parallel section generally parallel to said axis;

first roller means mounted to one side or said clamp means for rolling movement between said transverse and parallel sections of said first escapement channel means in movement of said clamp means between said first and second positions;

second escapement channel means having a transverse section generally transverse to the axis of said elongated said loading chamber and a parallel section generally parallel to said axis; and second roller means mounted to the opposite side of said clamp means for rolling movement between said transverse and parallel sections of said first escapement channel means in movement of said clamp means between said first and second positions.

6. The camera of claim 1 wherein said positive insertion means further comprises:

carriage means for movement alongside said elongated loading chamber between an insertion position and a latch position;

clamp means mounted for pivotal movement from a first position to a second position with respect to said carriage means;

first means extending from said clamp means into said loading chamber for making contact with said drive end of said film cartridge upon partial manual loading of said film cartridge and for pivoting said clamp means to said second position;

second means extending from said clamp means into said loading chamber and into engagement with said elongated retention slot on movement of said clamp means into said second position;

tensioning means lot moving said carriage means to said latch position;

escapement means for maintaining said carriage means in said insertion position against the tension of said tensioning means when said clamp means is in said first position and responsive to movement of said clamp means into said second position for releasing said carriage means for movement to said latch position while maintaining said second means in engagement with said elongated retention slot to load and seat said film cartridge in said loading chamber.

7. The camera of claim 6 wherein said escapement means further comprises:

first escapement channel means having a transverse section generally transverse to the axis of said elongated said loading chamber and a parallel section generally parallel to said axis;

first roller means mounted to one side of said clamp means for rolling movement between said transverse and parallel sections of said first escapement channel means in movement of said clamp means between said first and second positions;

second escapement channel means having a transverse section generally transverse to the axis of said elongated said loading chamber and a parallel section generally parallel to said axis; and second roller means mounted to the opposite side of said clamp means for rolling movement between said transverse and parallel sections of said first escapement channel means in movement of said clamp means between said first and second positions.

8. The camera of claim 7 wherein said positive insertion means seats said film cartridge fully into said loading chamber with an audible sound.

9. A camera for receiving an elongated film cartridge having a drive end and having a positive engagement element formed therein comprising:

an elongated loading chamber in a camera body portion having an end opening for receiving said elongated film cartridge loaded manually through said end opening;

a carriage mounted on a carriage track for movement alongside said elongated loading chamber between an insertion position and a latch position;

a clamp pivotal between first and second positions and attached by a pivot point to said carriage and movable therewith between said insertion position and latch position, said clamp having a first tab extending into said loading chamber in said first position and adapted to engage said film cartridge drive end manually loaded into said loading chamber to pivot said pivotal clamp from said first position to said second position and a second tab adapted to extend into said loading chamber and into engagement with said positive engagement element on pivotal movement of said pivotal clamp into said second position;

a tensioning spring coupled between said carriage and said camera body encouraging movement of carriage from said insertion position into said latch position; and an insertion escapement formed in said camera body portion having an escapement channel maintaining said clamp and carriage in said insertion position until said clamp is pivoted into said second position by loading of a film cartridge.

10. The camera of claim 9 wherein said escapement further comprises:

a first escapement channel having a transverse section generally transverse to the axis of said elongated said loading chamber and a parallel section generally parallel to said axis;

a first roller mounted to one side of said clamp for rolling movement between said transverse and parallel sections of said first escapement channel in movement of said clamp between said first and second positions;

a second escapement channel having a transverse section generally transverse to the axis of said elongated said loading chamber and a parallel section generally parallel to said axis; and a second roller mounted to the opposite side of said clamp means for rolling movement between said transverse and parallel sections of said first escapement channel in movement of said clamp between said first and second positions.

11. A camera having a loading chamber for receiving a film cartridge of the type having a positive engagement element formed therein comprising:

a loading chamber for receiving said film cartridge loaded manually through an end opening thereof; and a positive insertion mechanism operable upon partial manual loading of the cartridge through said end opening into engagement with said positive engagement means for positively pulling and seating said film cartridge fully into said loading chamber to assure the user that said film cartridge is loaded properly in said loading chamber, said film cartridge further including an elongated cartridge shell for retaining a photographic filmstrip and said positive engagement element further including an elongated retention slot formed in said cartridge shell along the length thereof.

12. The camera of claim 11 wherein said positive insertion means seats said film cartridge fully into said loading chamber with an audible sound.

13. The camera of claim 12 wherein said positive insertion mechanism further comprises:

a carriage for movement alongside said elongated loading chamber between an insertion position and a latch position;

a clamp mounted for pivotal movement from a first position to a second position with respect to said carriage;

a first tab extending from said clamp into said loading chamber for making contact with said drive end of said film cartridge upon partial manual loading of said film cartridge and for pivoting said clamp to said second position;

a second tab extending from said clamp into said loading chamber and into engagement with said elongated retention slot on movement of said clamp into said second position;

a tensioning spring for encouraging movement of carriage from said insertion position into said latch position on movement of said clamp into said second position; and an insertion escapement formed in said camera body portion and maintaining said clamp and carriage in said insertion position until said clamp is pivoted into said second position by loading of a film cartridge.

14. The camera of claim 13 wherein said insertion escapement is further responsive to movement of said clamp into said second position for releasing said carriage for movement to said latch position while maintaining said second tab in engagement with said elongated retention slot to load and seat said film cartridge in said loading chamber.

15. The camera of claim 14 wherein said insertion escapement further comprises:

a first escapement channel having a transverse section generally transverse to the axis of said elongated said loading chamber and a parallel section generally parallel to said axis a first roller mounted to one side of said clamp for rolling movement between said transverse and parallel sections of said first escapement channel in movement of said clamp between said first and second positions;

a second escapement channel having a transverse section generally transverse to the axis of said elongated said loading chamber and a parallel section generally parallel to said axis; and a second roller mounted to the opposite side of said clamp means for rolling movement between said transverse and parallel sections of said first escapement channel in movement of said clamp between said first and second positions.

16. The camera of claim 11 wherein said positive insertion mechanism further comprises:

a carriage for movement alongside said elongated loading chamber between an insertion position and a latch position;

a clamp mounted for pivotal movement from a first position to a second position with respect to said carriage;

a first tab extending from said clamp into said loading chamber for making contact with said drive end of said film cartridge upon partial manual loading of said film cartridge and for pivoting said clamp to said second position;

a second tab extending from said clamp into said loading chamber and into engagement with said positive engagement element on movement of said clamp into said second position;

a tensioning spring for encouraging movement of carriage from said insertion position into said latch position on movement of said clamp into said second position; and an insertion escapement formed in said camera body portion and maintaining said clamp and carriage in said insertion position until said clamp is pivoted into said second position by loading of a film cartridge.

17. The camera of claim 16 wherein said insertion escapement is further responsive to movement of said clamp into said second position for releasing said carriage for movement to said latch position while maintaining said second tab in engagement with said positive engagement element to load and seat said film cartridge in said loading chamber.

18. The camera of claim 17 wherein said insertion escapement further comprises:

a first escapement channel having a transverse section generally transverse to the axis of said elongated said loading chamber and a parallel section generally parallel to said axis;

a first roller mounted to one side of said clamp for rolling movement between said transverse and parallel sections of said first escapement channel in movement of said clamp between said first and second positions;

a second escapement channel having a transverse section generally transverse to the axis of said elongated said loading chamber and a parallel section generally parallel to said axis; and a second roller mounted to the opposite side of said clamp means for rolling movement between said transverse and parallel sections of said first escapement channel in movement of said clamp between said first and second positions.

\* \* \* \* \*